(12) United States Patent
Springer

(10) Patent No.: US 12,476,706 B2
(45) Date of Patent: Nov. 18, 2025

(54) USING A LIGHT COMMUNICATIONS SYSTEM TO CAUSE AN UPDATE ASSOCIATED WITH A VIRTUAL MEETING

(71) Applicant: Zoom Communications, Inc., San Jose, CA (US)

(72) Inventor: Shane Paul Springer, Oregon City, OR (US)

(73) Assignee: Zoom Communications, Inc., San Jose, CA (US)

( * ) Notice: Subject to any disclaimer, the term of this patent is extended or adjusted under 35 U.S.C. 154(b) by 285 days.

(21) Appl. No.: 18/192,847

(22) Filed: Mar. 30, 2023

(65) Prior Publication Data

US 2024/0333388 A1 Oct. 3, 2024

(51) Int. Cl.
*H04B 10/114* (2013.01)

(52) U.S. Cl.
CPC ..... *H04B 10/1143* (2013.01); *H04B 10/1149* (2013.01)

(58) Field of Classification Search
CPC .......................................... H04B 10/114–1149
See application file for complete search history.

(56) References Cited

U.S. PATENT DOCUMENTS

| | | | |
|---|---|---|---|
| 7,383,121 B2 | 6/2008 | Shinada | |
| 9,680,571 B2 | 6/2017 | Breuer et al. | |
| 10,075,234 B2 | 9/2018 | Breuer et al. | |
| 10,215,636 B2 | 2/2019 | Fujii et al. | |
| 10,820,391 B2 | 10/2020 | Pederson | |
| 10,952,296 B2 | 3/2021 | Alexander et al. | |
| 11,290,465 B1* | 3/2022 | Lyons | H04N 7/15 |
| 2002/0161578 A1 | 10/2002 | Saindon et al. | |
| 2021/0319408 A1* | 10/2021 | Jorasch | H04L 12/1827 |
| 2022/0019333 A1 | 1/2022 | Powderly et al. | |
| 2022/0142717 A1 | 5/2022 | Zuhars et al. | |
| 2024/0080098 A1* | 3/2024 | Giustiniano | H04B 10/116 |
| 2024/0430008 A1* | 12/2024 | Wendt | H04B 10/40 |

FOREIGN PATENT DOCUMENTS

JP 2007131213 A 5/2007

* cited by examiner

*Primary Examiner* — Nathan M Cors
(74) *Attorney, Agent, or Firm* — Young Basile Hanlon & MacFarlane, P.C.

(57) ABSTRACT

A user device may use a light communications system to detect, from a light source in a physical space, light in a pattern that represents encoded information. The light communications system may include a sensor and an emitter. The user device may decode the encoded information based on the pattern to cause an update associated with a virtual meeting. In some implementations, the update may include the user device joining the virtual meeting using a meeting identifier. In some implementations, the update may include adjusting a microphone or a speaker in the physical space. In some implementations, the update may include a pairing between the user device and a second device that enables bidirectional communication between the user device and the second device.

20 Claims, 9 Drawing Sheets

US 12,476,706 B2

USING A LIGHT COMMUNICATIONS SYSTEM TO CAUSE AN UPDATE ASSOCIATED WITH A VIRTUAL MEETING

FIELD

This disclosure relates generally to virtual meetings and, more specifically, to using a light communications system to cause an update associated with a virtual meeting.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION OF THE DRAWINGS

Figure 1:
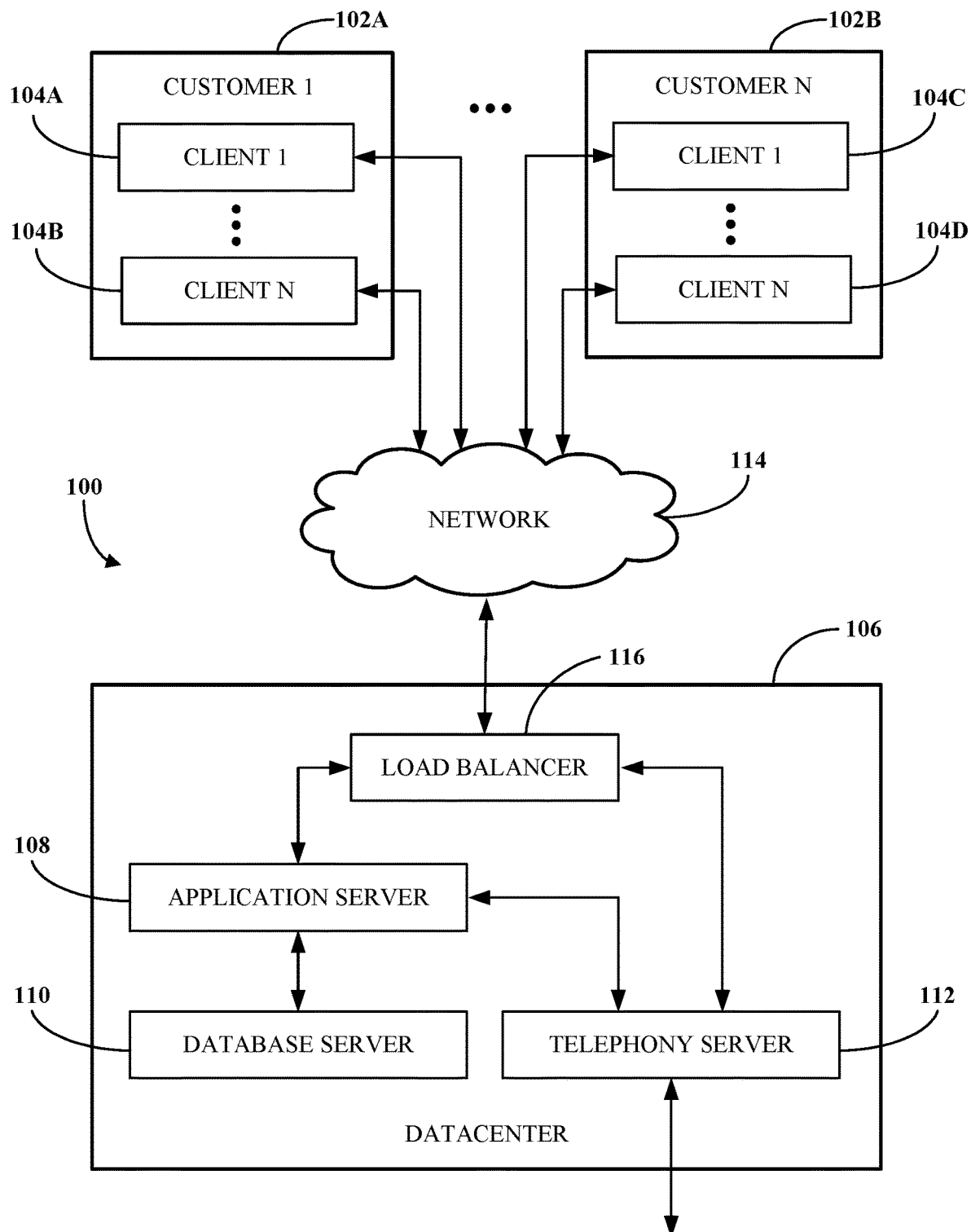
FIG. 1 is a block diagram of an example of an electronic computing and communications system.

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises systems, meaning that remote workers and those who are generally increasingly mobile may be unable to rely upon them. One type of system which addresses problems such as these includes a unified communications as a service (UCaaS) platform, which includes several communications services integrated over a network, such as the Internet, to deliver a complete communication experience regardless of physical location.

Individuals may use software such as of a UCaaS platform to communicate and collaborate remotely with one another in virtual meetings (e.g., video conferences). In some cases, it may be desirable for the virtual meeting to be a hybrid meeting in which some meeting participants are in-person participants attending the virtual meeting together from a physical space (e.g., a conference room or classroom) while other meeting participants are remote participants attending the virtual meeting separately from remote locations (e.g., their homes or separate offices). It may also sometimes be desirable for in-person participants to bring their own devices into the physical space and collaborate (e.g., connect to the virtual meeting) using their own devices.

However, conventional approaches for allowing in-person virtual meeting participants to connect to a virtual meeting using their own devices, due to their technical and design limitations, may be burdensome or otherwise result in delay, disruption, or other consequences to the virtual meeting. For example, devices which require Bluetooth or Wi-Fi connectivity may require multiple steps for users to connect their devices to a virtual meeting from a physical space shared by in-person participants, such as enabling a wireless service, locating a correct device or network, and invoking a particular application. Moreover, wireless connection approaches such as Bluetooth® (e.g., short range wireless communication) and Wi-Fi may suffer from radio interference and noise which may vary from one physical space to another. As a result, an in-person virtual meeting participant may be limited in the use of their device during a virtual meeting and may thus have to rely instead on hardware already configured in the physical space.

Implementations of this disclosure address problems such as these by connecting meeting participant devices to a virtual meeting or otherwise causing an action with respect to the virtual meeting using a light pattern emitted by a light from a light source (e.g., a light emitting diode (LED)) arranged in a physical space. The light may be emitted in a pattern that represents encoded information. For example, the light may be emitted using Li-Fi, a wireless communication technology that uses light to transmit information between devices. The light may be emitted in a pulsing pattern or with a modulation of intensity, such as by cycling a light source on and off in a particular frequency range, resulting in a unique signature carrying data. The light may in some cases be emitted so that it is imperceptible to the human eye, such as by the spectrum of light that is emitted (e.g., ultraviolet) or the frequency range of the pattern (e.g., faster than humanly observable). A user device using a light communications system (e.g., a smartphone, tablet, laptop, or other computer, having a sensor and an emitter, such as a camera and a light source, respectively) can detect the light emitted in the pattern from another light communications system configured in the physical space (e.g., another sensor and emitter in the physical space, such as another camera and light source). For example, when a user enters the physical space while carrying the user device, or when an application on the user device is active while the user device is in the physical space, the user device can use the sensor of the user device's light communications system to automatically detect the light in the pattern. The user device may then decode the encoded information represented by the pattern to determine the information (e.g., a virtual meeting identifier or another identifier, such as for a hardware component or for determining a position or a direction of the user device). For example, the light pattern may be decoded using Li-Fi. The user device may then apply the information to cause one or more updates (e.g., actions).

The one or more updates are indicated by the encoded information and thus determined based on a decoding of the encoded information. In some implementations, an update may include causing an event in a virtual meeting, such as the user device joining the virtual meeting as a companion device, invoking whiteboard tools for the user to use in the virtual meeting, such as when the user is near a whiteboard in the physical space, or moving the user to a virtual breakout room associated with the virtual meeting based on the user's location in the physical space. In some implementations, an update may include causing a change in a hardware component located in the physical space during a virtual meeting, such as activating, deactivating, or adjusting a particular microphone, speaker, headset, or light in the physical space based on the user's location or activity as the user participates in the virtual meeting. In some implementations, an update may include causing a pairing between the user device and another device (e.g., the hardware component or other device, such as a second user device) that enables bidirectional communication between them. The pairing may be enabled, for example, via Wi-Fi or Bluetooth. In some implementations, a system associated with the physical space may determine encoded information associated with a virtual meeting, may determine a light pattern that represents the encoded information, and may cause the light communications system in the physical space to emit the light pattern. The light pattern may configure a user device that detects the light pattern to perform an action associated with the virtual meeting.

To describe some implementations in greater detail, reference is first made to examples of hardware and software structures used to implement a system for using light communications. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106. For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
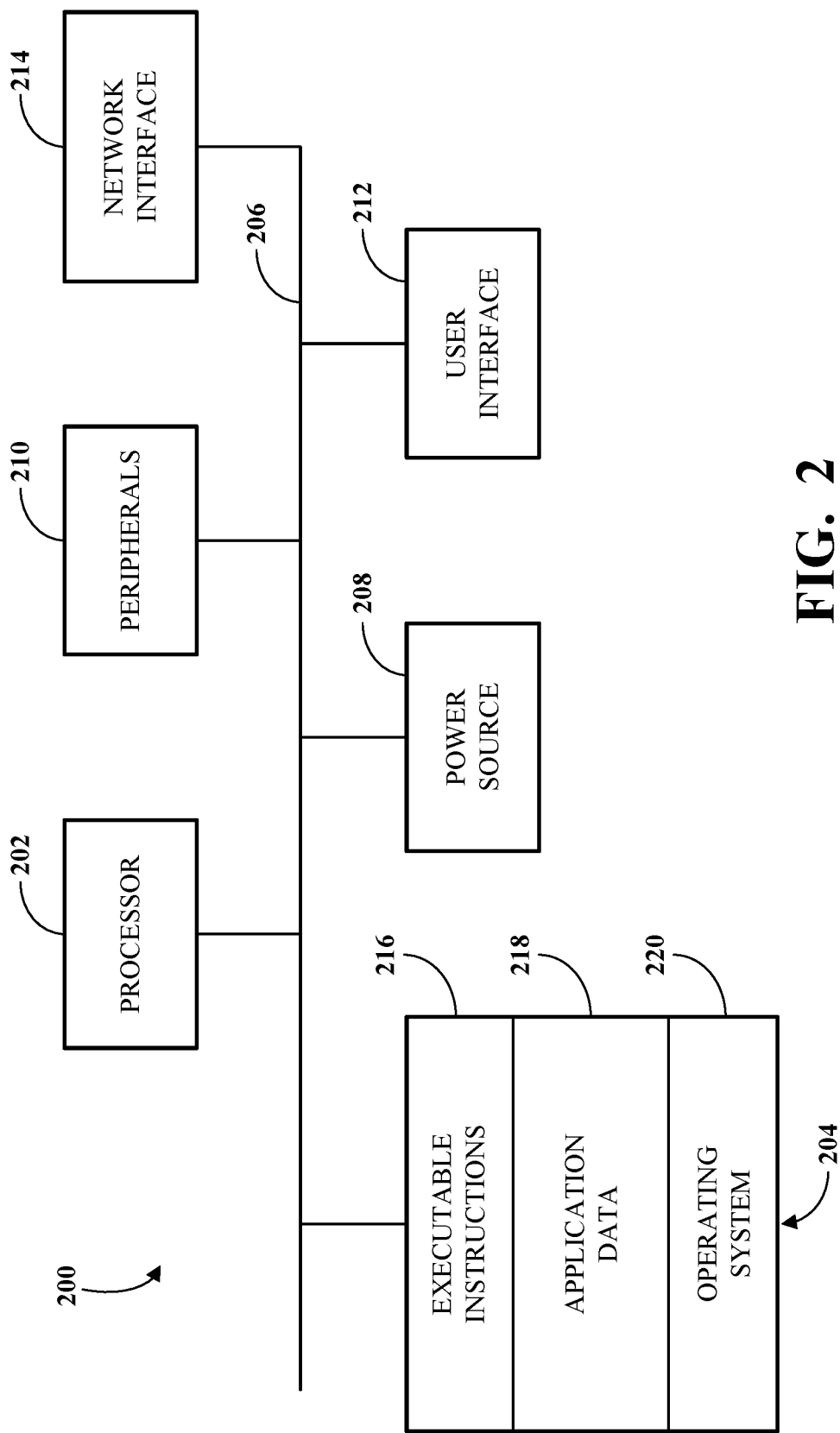
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR DRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, virtual reality display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
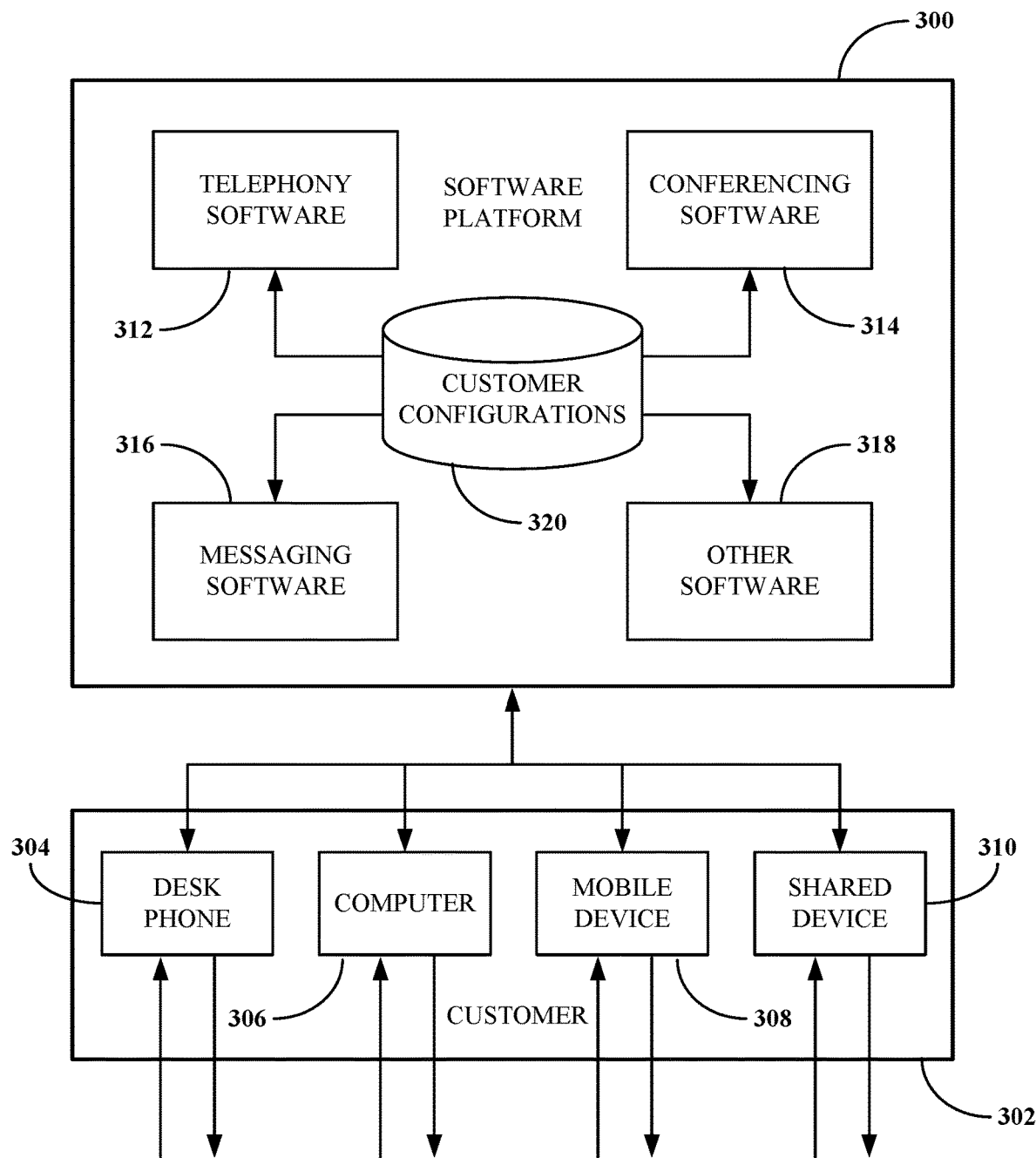
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients-a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include light communications software, such as for causing an update associated with a virtual meeting (e.g., by decoding encoded information represented by a light pattern) and/or for encoding information represented by a light pattern to configure a user device for a virtual meeting. In some such cases, the conferencing software 314 may include some or all of the other software 318.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some, or all, of the software 312 through 318 may be combined into a single software application run on clients of the customer, such as one or more of the clients 304 through 310.

Figure 4:
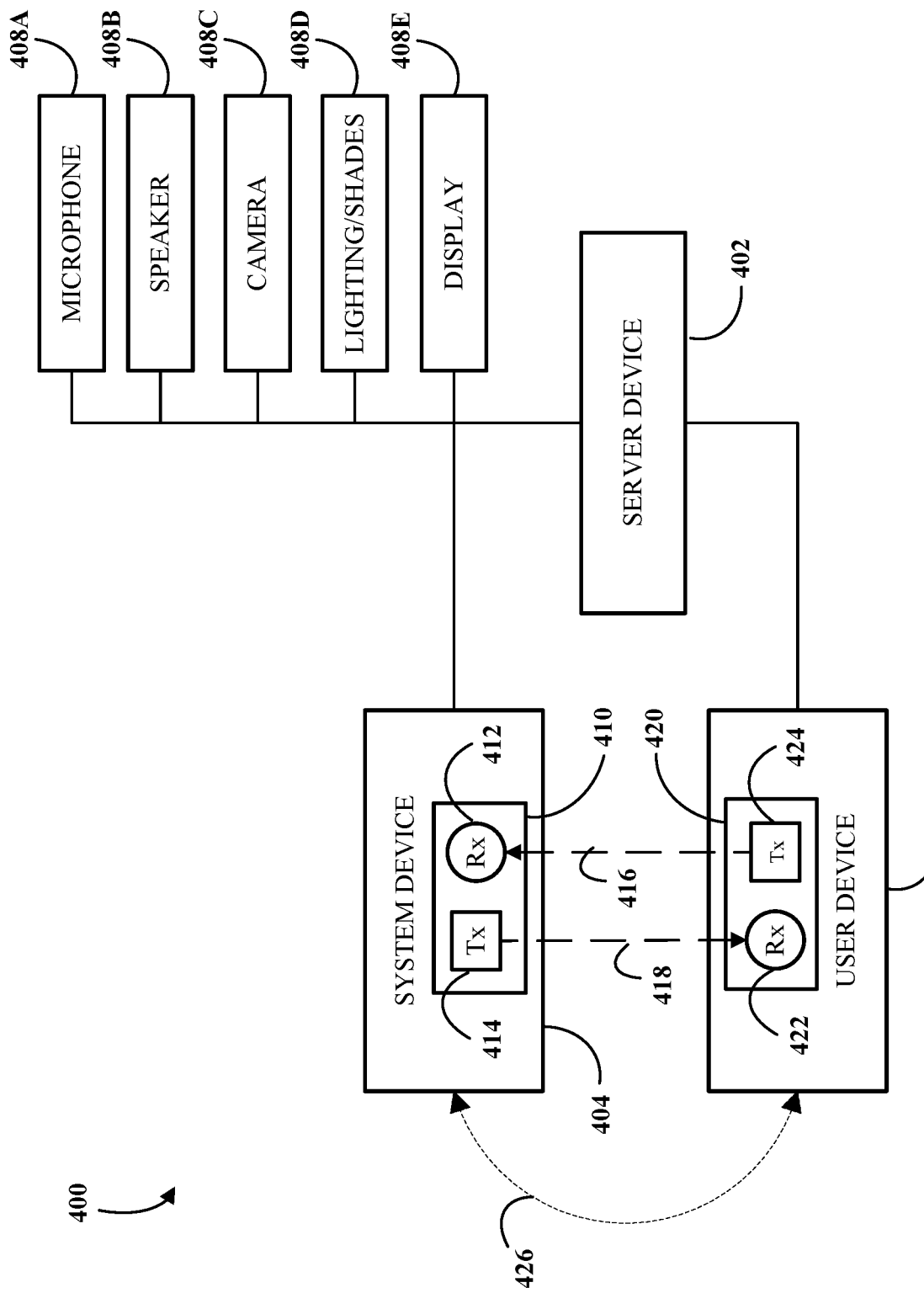
FIG. 4 is a block diagram of an example of a system that uses light communications.

FIG. 4 is a block diagram of an example of a system 400 that uses light communications. The system 400 may include a server device 402, a system device 404, a user device 406, and one or more peripheral devices, such as a microphone 408A, a speaker 408B, a camera 408C, lighting/shades 408D (e.g., actuators controlling ambient lighting and/or window darkening shades in the physical space), and a display 408E. The system device 404 and the peripheral devices 408A-D may be arranged in a physical space, such as a conference room, classroom, or other environment where a physical meeting may occur. While one system device is shown by way of example, the system 400 could include multiple system devices in the physical space. The system device 404 and the peripheral devices 408A-D may connect to a server device 402, which could be part of a distributed computing system (e.g., a client-server computing system), a cloud computing system, a clustered computing system, or the like. The server device 402 may execute software (e.g., server-side conferencing software, such as the conferencing software 314) to support a virtual meeting between users using user devices, such as the user device 406. For example, the server device 402 could be a server at the datacenter 106 shown in FIG. 1, such as the application server 108 or the telephony server 112.

The system device 404 may use a light communications system 410. The light communications system 410 may include a sensor 412 and an emitter 414. The sensor 412 may be configured to detect light in a light pattern 416 from an emitter for light communications. The sensor 412 may include a lens, mask, polarization layer, and/or filter to control light that is received (e.g., passing light in the spectrum of the light pattern 416 while blocking light in other spectrums and/or blocking ambient light in the physical space). In some implementations, the sensor 412 may be or include a photosensor, photodiode, or image sensor, such as of a camera. The emitter 414 may be configured to emit light in a particular spectrum with a light pattern 418 for light communications. For example, the emitter 414 could include an LED, laser, or other light source.

The user device 406 could be a smartphone, tablet, laptop, or other computer or wearable device which may be associated with a user. For example, a user might carry the user device 406 into the physical space when attending a meeting, or might start an application on the user device 406 when the user device 406 is in the physical space. While one user device is shown by way of example, the system 400 could include multiple user devices, which may be associated with one or multiple users. The user device 406 may use a light communications system 420. The light communications system 420 may include a sensor 422 and an emitter 424. The sensor 422 may be configured to detect light in a light pattern for light communication, such as the light pattern 418 from the emitter 414. Similar to the sensor 412, the sensor 422 may be or include a lens, mask, polarization layer, and/or filter to control light that is received (e.g., passing light in the spectrum of the light pattern 418 while blocking light in other spectrums and/or blocking ambient light in the physical space). In some implementations, similar to the sensor 412, the sensor 422 may be or include a photosensor, photodiode, or image sensor, such as of a camera. Similar to the emitter 414, the emitter 424 may be configured to emit light in a particular spectrum with a light pattern for light communication, such as emitting light in the light pattern 416 to the sensor 412. For example, the emitter 424 could include an LED, laser, or other light source, and may be like the emitter 414.

The server device 402 and/or the system device 404 may execute light communications software (e.g., server-side software, such as the other software 318) which may be linked to the physical space. For example, the server device 402 and/or the system device 404 may run continuously or otherwise periodically in the physical space while user devices run intermittently as they enter, activate an application, deactivate the application, and/or leave the physical space. The server device 402 and/or the system device 404, in executing the software, may determine encoded information that may be represented by a light pattern (e.g., a pulsing or modulating pattern, such as cycling on and off in a particular frequency range, resulting in a unique signature carrying data). For example, the encoded information may be associated with a virtual meeting (e.g., a meeting identifier or access token), one or more of the peripheral devices 408A-D (e.g., an identifier for a hardware component), or position or direction information (e.g., an identifier for a determining a position or a direction of the user device 406). The server device 402 and/or the system device 404 may then cause the light communications system 410 to emit the light pattern 418 via the emitter 414. For example, the light pattern 418 may be emitted using Li-Fi. The light pattern 418, carrying the encoded information, may configure user devices that detect the light pattern 418, such as the user device 406, to perform an update (e.g., an action). The update may be associated with the virtual meeting or a hardware component. For example, the update could include steps to join the user device 406 to the virtual meeting (via the meeting identifier) or control one or more of the peripheral devices 408A-D (via the identifier for the hardware component), during the virtual meeting, and based on the position or a direction of the user device 406.

The user device 406 may also execute light communications software (e.g., client-side software), such as when a user activates a particular application on the user device 406. The application could run in the foreground or the background of the user device 406 when the application is active. The application being active may enable the user device 406 to automatically detect the light pattern 418 that represents the encoded information. For example, activating the application could temporarily activate the sensor 422, such as the camera of the user device 406, for detecting light patterns. The user device 406 may then decode the encoded information based on the pattern to cause an update associated with a virtual meeting. For example, the light pattern 418 could be decoded using Li-Fi. The encoded information, when decoded, may enable authentication of the user device 406 in a virtual meeting. For example, the user device 406 could decode an identifier from the encoded information, query a cloud computing system (e.g., the server device 402, or another server at the datacenter 106 shown in FIG. 1) to authenticate the identifier, receive configuration information from the cloud computing system based on validity of the identifier, and self-configure based on the configuration information.

In some implementations, the update may include causing an event in a virtual meeting (e.g., where the user device 406 joins the virtual meeting as a companion device), invoking whiteboard tools for the user to use in the virtual meeting (e.g., where the user is in a position near a whiteboard in the physical space, or moving the user to a virtual breakout room associated with the virtual meeting based on the user's location in the physical space. In some implementations, the update may include causing a change in one or more of the peripheral devices 408A-D located in the physical space during a virtual meeting, such as activating, deactivating, or adjusting the microphone 408A, the speaker 408B, the camera 408C, the lighting/shades 408D, and/or the display 408E. The activating, deactivating, or adjusting could be based on the user's position, location, or activity in the physical space as the user participates in the virtual meeting. In some implementations, the update may include causing a pairing 426 between the user device 406 and the system device 404. The pairing 426 may enable bidirectional communication between the user device 406 and the system device 404. For example, the system device 404 could be another peripheral device, such as a wireless headset, which may be paired with the user device 406. The pairing 426 may be enabled, for example, via Wi-Fi or Bluetooth, responsive to the light communications. In some implementations, the update may include causing a pairing between the user device 406 and one or more of the peripheral devices 408A-D.

The light in the light pattern 416 and the light in the light pattern 418 may in some cases be imperceptible to the human eye. For example, the light may be imperceptible based on the spectrum of light that is emitted (e.g., ultraviolet). In another example, the light may be imperceptible based on the frequency range of the pattern (e.g., the pulsing pattern, cycling on and off at a rate that is faster than humanly observable).

The user device 406 may also execute the light communications software (e.g., the client-side software) to determine encoded information that may be represented by a light pattern (e.g., another pulsing or modulating pattern, such as cycling on and off in a particular frequency range, resulting in another unique signature carrying data). For example, the encoded information may be associated with the user device 406 (e.g., a device identifier for the user device 406 or information indicating a position or a direction of the user device 406). The user device 406 may then cause the light communications system 420 to emit the light pattern 416 via the emitter 424. For example, the light pattern 416 may be emitted using Li-Fi. The light pattern 416, carrying the encoded information, may enable the server device 402, via the system device 404 that detects the light pattern 416, to perform an update associated with the virtual meeting. For example, the update could include steps to join the user device 406 to the virtual meeting or control one or more of the peripheral devices 408A-D. For example, the server device 402 can output a message to signal the user (e.g., via the speaker 408B and/or the display 408E) to join the user device 406 the virtual meeting or transmit a notification to the user device 406 to notify the user that they are in the wrong room. The server device 402 and/or the system device 404 may execute the light communications software to automatically detect the light pattern 416 that represents the encoded information. The server device 402 and/or the system device 404 may detect the light pattern 416 using the sensor 412. The server device 402 and/or the system device 404 may decode the encoded information based on the pattern to cause the update.

In some implementations, a light communications system may include multiple sensors arranged in a sensor grid and/or a multiple emitters arranged in an emitter grid. The sensors in the sensor grid could be configured to detect light in different frequency ranges and/or light patterns, and the emitters in the emitter grid could be configured to emit light in different frequency ranges and/or light patterns. This may enable combinations of sensing and emitting with greater fidelity. In some implementations, the light communications system may include an emitter that emits visible light. This may enable illumination with colors to signify information to the user in addition to the encoded information transmitted to the user device 406. For example, the light pattern 418 could appear to a user as a green light providing a positive indication and/or a red light providing a negative indication.

In some implementations, the system device 404 may be integrated with a peripheral device, such as the microphone 408A, the speaker 408B, the camera 408C, the lighting/shades 408D, and/or the display 408E. For example, when integrated with the display 408E, the emitter 414 of the light communications system 410 could be implemented by one or more LEDs in the display 408E (e.g., a liquid crystal display). This may enable emitting the encoded information to the user device 406 when the user device 406 is pointed in a direction toward the display 408E.

In some implementations, a light communications system may be used in conjunction with wireless, ultrasound, and/or radiofrequency (RF) signals. For example, the system device 404 can emit the light pattern 418 to signal the user device 406 to send a wireless, ultrasound, and/or RF signal to communicate information, such as a confirmation that the user device 406 is in the correct area and is associated with a user that has registered for a meeting in the physical space and/or the virtual meeting.

In some implementations, a light communications system may be implemented using a wearable device. For example, the user device 406, and/or the light communications system 420 associated with the user device 406, could be implemented by electronic glasses or an electronic wristband. When a user enters a physical space wearing the wearable device, the user can use the light communications system provided by the wearable device to communicate with the light communications system provided in the physical space. In some implementations, the light communications system may be implemented using a virtual reality (VR) system.

Figure 5:
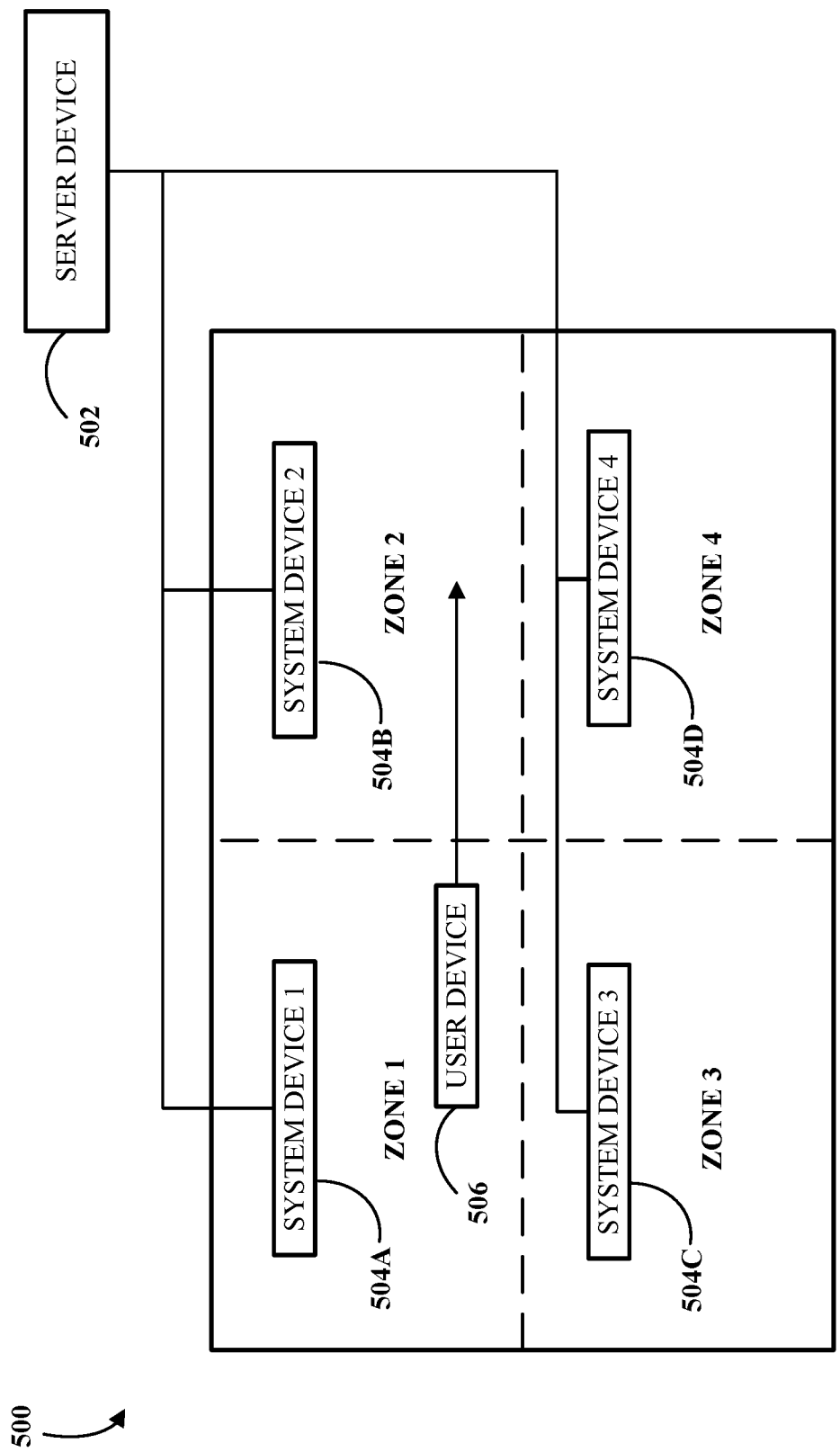
FIG. 5 is a block diagram of an example of a physical space with multiple zones.

FIG. 5 is a block diagram of an example of a physical space 500. The physical space 500 may be divided into multiple zones, such as "zone 1," "zone 2," "zone 3," and "zone 4." The physical space 500 is some space from within which one or more in-person participants of a virtual meeting attend the virtual meeting. The physical space 500 could, for example, be a conference room, classroom, arena, expo hall, or other environment where a physical meeting may occur. A system device like the system device 404 of FIG. 4, and/or one or more peripheral devices like the microphone 408A, the speaker 408B, the camera 408C, the lighting/shades 408D, and/or the display 408E of FIG. 4, could be in one or more zones of the multiple zones. For example, the physical space 500 may include a system device 504A in zone 1, a system device 504B in zone 2, a system device 504C in zone 3, and a system device 504D in zone 4. The system devices 504A to 504D may be like the system device 404. The system devices 504A to 504D could be impregnated in static surfaces, such as the walls, floors, ceiling, or other immovable surfaces, and/or dynamic surfaces, such as desks, tables, chairs, podiums, or other movable objects, to define the zones. The system devices 504A to 504D may connect to a server device 502 like the server device 402.

A user device 506, like the user device 406, could be brought into the physical space 500, such as by a user carrying the user device 506, to passively consume the light from the system devices in the zones. Further, the user device 506 could move from one zone to another, such as from zone 1 to zone 2, with different results during a virtual meeting. For example, the user might initially set up the user device 506 in zone 1 during a meeting (e.g., a desk or chair), then move with the user device 506 to zone 2 during the meeting (e.g., a whiteboard or podium). As the user device 506 moves from one zone to another, the light patterns associated with the zones may cause different updates to occur. For example, when the user device 506 is in zone 1, the update may include causing an event in a virtual meeting, such as the user device 506 joining the virtual meeting as a companion device, and activating overhead lighting in zone 1 via a peripheral device, like the lighting/shades 408D. Then, when the user device 506 moves to zone 2, the update may include deactivating the overhead lighting in zone 1, adjusting a microphone or a speaker in zone 2, invoking whiteboard tools for the user to use in the virtual meeting (based on the user's location in zone 2 being near a physical whiteboard), and/or moving the user to a virtual breakout room in the virtual meeting (based on the user's location in zone 2). As a result, the zones may enable contextual switching to occur.

When implementing the zones, a light pattern emitted from system device in a particular zone may be constrained or localized to that zone. For example, a first light pattern emitted from system device 504A may be constrained to zone 1, a second light pattern emitted from system device 504B may be constrained to zone 2, and so forth. The light pattern may be constrained to the zone (e.g., prevented from leaving the zone) in a different ways. For example, a lens, mask, physical cone, or polarization layer, configured with respect to an emitter of the light communications system of the system device, may focus or limit the light pattern to the area defined by the zone. In another example, light barriers arranged in the physical space 500, such as an opaque curtain, wall, furniture, or other structure, may limit the light pattern to the area defined by the zone.

Figure 6:
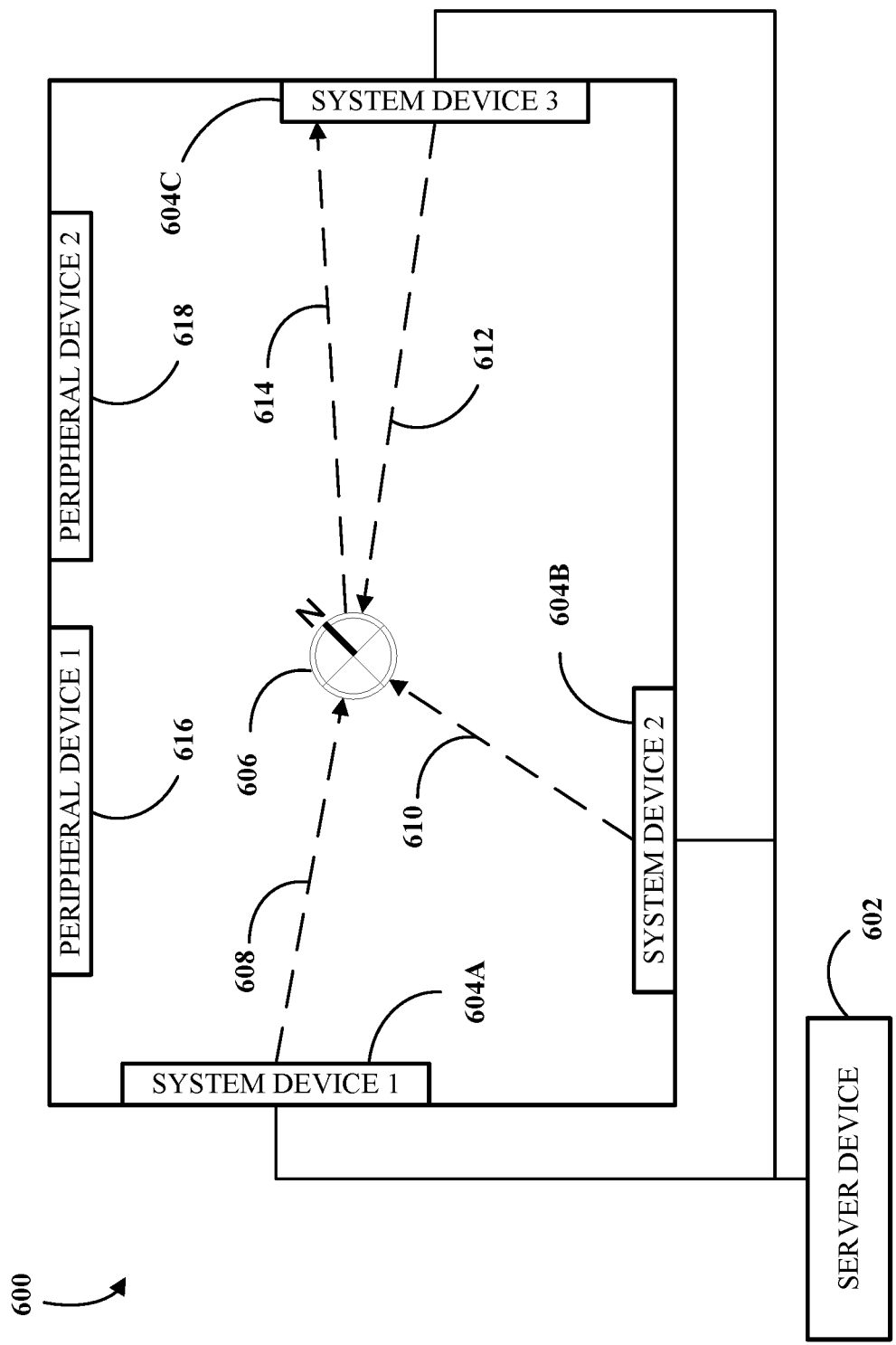
FIG. 6 is a block diagram of an example of determining a location and a direction of a user device in a physical space based on light communications.

FIG. 6 is a block diagram of an example of determining a position and a direction of a user device 606 in a physical space 600 based on light communications. The physical space 600 could be a conference room, classroom, arena, expo hall, or other environment where a physical meeting may occur. In some cases, the physical space 600 could be a zone in another physical space, such as zone 1 in the physical space 500. One or more system devices like the system device 404 of FIG. 4, and/or one or more peripheral devices like the microphone 408A, the speaker 408B, the camera 408C, the lighting/shades 408D, and/or the display 408E of FIG. 4, could be in the physical space 600. For example, the physical space 600 could include a first system device 604A, a second system device 604B, a third system device 604C, a first peripheral device 616, and a second peripheral device 618. The system devices and the peripheral devices may connect to a server device 602, like the server device 402.

The user device 606, like the user device 406 of FIG. 4, could be brought into the physical space 600, such as by a user carrying the user device 606. In some cases, an application of the user device 606 might be deactivated or turned off while in the physical space 600, then the user might activate or turn on the application. As the user moves in the physical space 600, the user device 606 may change positions and directions. At various times, the user device 606 may detect one or more of a first light pattern 608 from the first system device 604A, a second light pattern 610 from the second system device 604B, and a third light pattern 612 from the third system device 604C. The first light pattern 608 could carry first encoded information associated with first position information (e.g., a first coordinate location, on the left wall), the second light pattern 610 could carry second encoded information associated with second position information (e.g., a second coordinate location, on the back wall), and the third light pattern 612 could carry third encoded information associated with third position information (e.g., a third coordinate location, on the right wall). The user device 606 may detect the light patterns at different times, from different emitters, and/or using different sensors. For example, at a particular time, the user device 606 might detect the third light pattern 612 with a first sensor (e.g., a forward facing sensor, such as a front camera), while also detecting the first light pattern 608 and the second light pattern 610 with a second sensor (e.g., a rear facing sensor, such as a back camera).

The user device 606, in turn, may indicate the detections and/or the timing differences of the detected light patterns to the server device 602. For example, the user device 606 could emit a fourth light pattern 614 in the physical space 600. The fourth light pattern 614 could carry fourth encoded information to one or more system devices in the physical space 600 that may detect the fourth light pattern 614, such as the third system device 604C. The fourth encoded information may be associated with the user device 606, and may include a device identifier, indications of the detections, the timing differences, and/or other information for indicating a position or a direction (e.g., sensor data from the user device 606, such as global positioning system (GPS), compass, or accelerometer data). In another example, the user device 606 may indicate the device identifier, indications of the detections, the timing differences, and/or other information to the server device 602 via a wireless, ultrasound, and/or RF signals. Using the device identifier, indications of the detections, the timing differences, other information for indicating a position or a direction, the sensor configuration of the user device 606 (e.g., forward facing sensor and rear facing sensor), and/or known locations of the system devices, the server device 602 can determine the position or location of the user device 606 in the physical space 600.

In some implementations, the server device 602 can detect when light from a light communications system is occluded or blocked. This may enable detecting a user in the physical space 600 that has not yet connected their user device. For example, the system devices may emit the light patterns while monitoring for receipt of the light patterns using their sensors (e.g., analogous to a light curtain). When the light patterns are detected (e.g., not occluded), the server device 602 might determine that a user has not yet entered the physical space 600. However, when one or more of the light patterns are not detected (e.g., occluded from the sensor), the server device 602 might determine that a user has entered the physical space 600 and is causing the one or more of the light patterns to be occluded.

In some implementations, to confirm the determination of a user in the physical space 600, the server device 602 might communicate with a peripheral device, such as the first peripheral device 616. For example, the first peripheral device 616 could be a pan-tilt-zoom camera (e.g., the camera 408C), and the server device 602 might use a facial recognition system, implemented via the camera, to locate a person in the physical space. In another example, the first peripheral device 616 could be a microphone (e.g., the microphone 408A), and the server device 602 might use a sound detection system, implemented via the microphone, to locate a person in the physical space. When the first peripheral device 616 detects a person, the server device 602 might determine that a user has entered the physical space 600.

In some implementations, if the server device 602 determines a person has entered the physical space 600, the server device 602 might communicate with another peripheral device, such as the second peripheral device 618, for prompting the user. For example, the second peripheral device 618 could be a speaker (e.g., the speaker 408B), and the server device 602 might use the speaker to welcome the user, announce the meeting, and/or invite the user to connect their user device in the physical space (e.g., via a light communications system implemented by a system device). In another example, the second peripheral device 618 could be a display (e.g., the display 408E), and the server device 602 might use the display to welcome the user, announce the meeting, and/or invite the user to connect their user device.

In some implementations, the server device 602 might communicate with peripheral devices in the physical space 600 based on the position and/or the direction of the user device 606. For example, when the user device 606 is detected in a first area of the physical space 600, such as closer to the first system device 604A, the server device 602 might activate a microphone, speaker, or lighting in the first area. Then, when the user device 606 moves to a second area of the physical space 600, such as closer to the third system device 604C, the server device 602 might deactivate the microphone, speaker, or lighting in the first area, activate a microphone, speaker, or lighting in the second area, invoke whiteboard tools for the user to use in a virtual meeting, and/or move the user to a virtual breakout room in the virtual meeting based on the user's location in the second area. The server device 602 may also adjust a pan-tilt-zoom camera (e.g., the camera 408C) to change focus and follow the user from one zone to another.

In some implementations, a machine learning model may receive input from the system devices and/or the user device 606 to predict the position and/or the direction of the user device 606 or the user based on the user device 606. For example, if the user device 606 is determined to be pointed in a particular direction, the machine learning model could predict that the user is on a certain side of a table or in a certain chair. In some implementations, the machine learning model could receive input from the system devices and/or the user device 606 to predict a system device that is closest to the user device 606. This may enable, for example, prioritizing encoded information to the user device 606, such as prioritizing encoded information from one system device that is closer to the user device 606 over encoded information from another system device that is further from the user device 606 (e.g., both of which emitting light patterns that the user device 606 might detect). In some implementations, the prediction may include a comparative analysis of light patterns that are received from system devices (e.g., timing differences) for predicting which system device should be prioritized.

Figure 7:
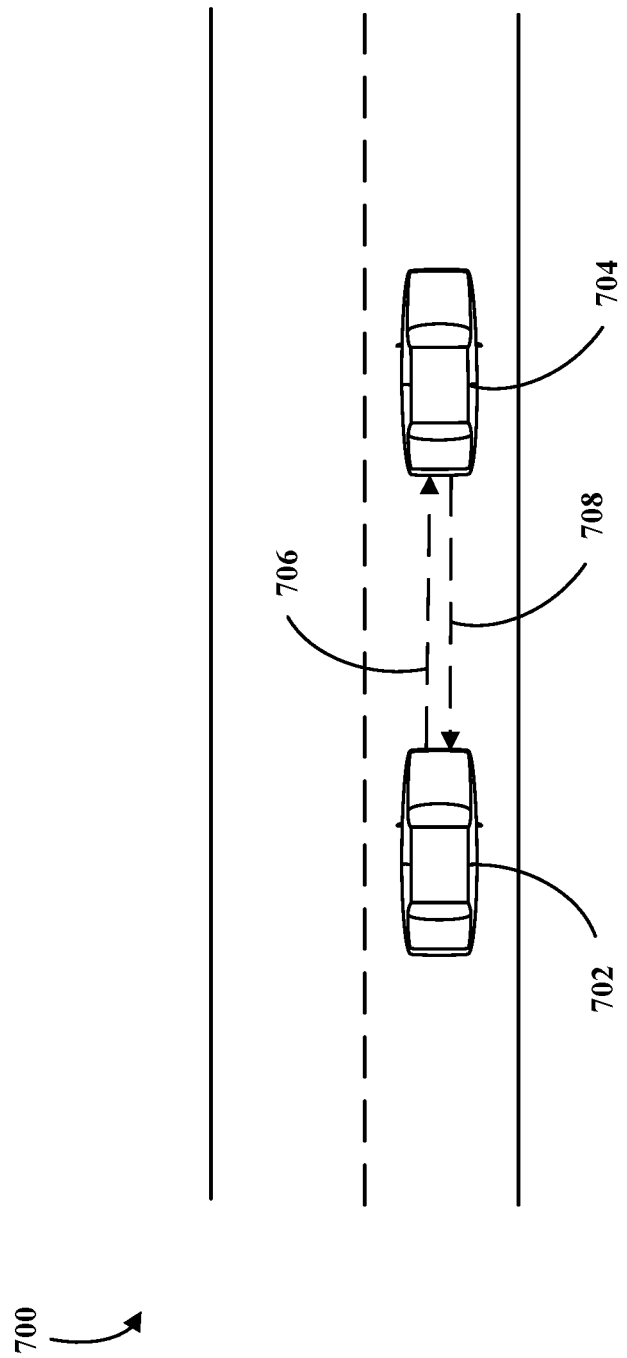
FIG. 7 is a block diagram of an example of a vehicle transportation network.

FIG. 7 is a block diagram of an example of a vehicle transportation network 700. The vehicle transportation network 700 may define a physical space for a virtual meeting that includes multiple vehicles, such as a first vehicle 702 and a second vehicle 704. The vehicles may include devices with light communications systems, such as the system device 404 and the user device 406 of FIG. 4. The devices may enable the vehicles to emit and detect light in patterns. For example, the first vehicle 702 may include a system that determines a first light pattern 706 that represents first encoded information, and causes a device in the first vehicle 702 to emit the first light pattern 706 to configure a system in the second vehicle 704. The second vehicle 704 may detect the first light pattern 706, via a device in the second vehicle 704, and may decode the first encoded information based on the first light pattern 706. Similarly, the second vehicle 704 may use the system to determine a second light pattern 708 that represents second encoded information, and causes the device in the second vehicle 704 to emit the second light pattern 708 to configure the system in the first vehicle 702. The first vehicle 702 may detect the second light pattern 708, via the device in the first vehicle 702, and may decode the second encoded information based on the second light pattern 708.

Like the system device 404 and the user device 406 of FIG. 4, the light communications between the first vehicle 702 and the second vehicle 704 may establish a virtual handshaking. The virtual handshaking may enable a virtual meeting between the first vehicle 702 and the second vehicle 704, which could include an exchange of text messages, a video conference, or other communication between passengers of the vehicles. In some implementations, the light communications may enable initiating a network between the vehicles to enable communications via other modalities (e.g., wireless, ultrasound, and/or RF signals). In some implementations, the light communications may enable configuring a proximity aware voice channel for discussion between passengers of the vehicles. The light communications may also enable receiving vehicle identifiers, which could be anonymized, and which could correspond to dates, times, and/or a geolocations associated with the receipt.

Figure 8:
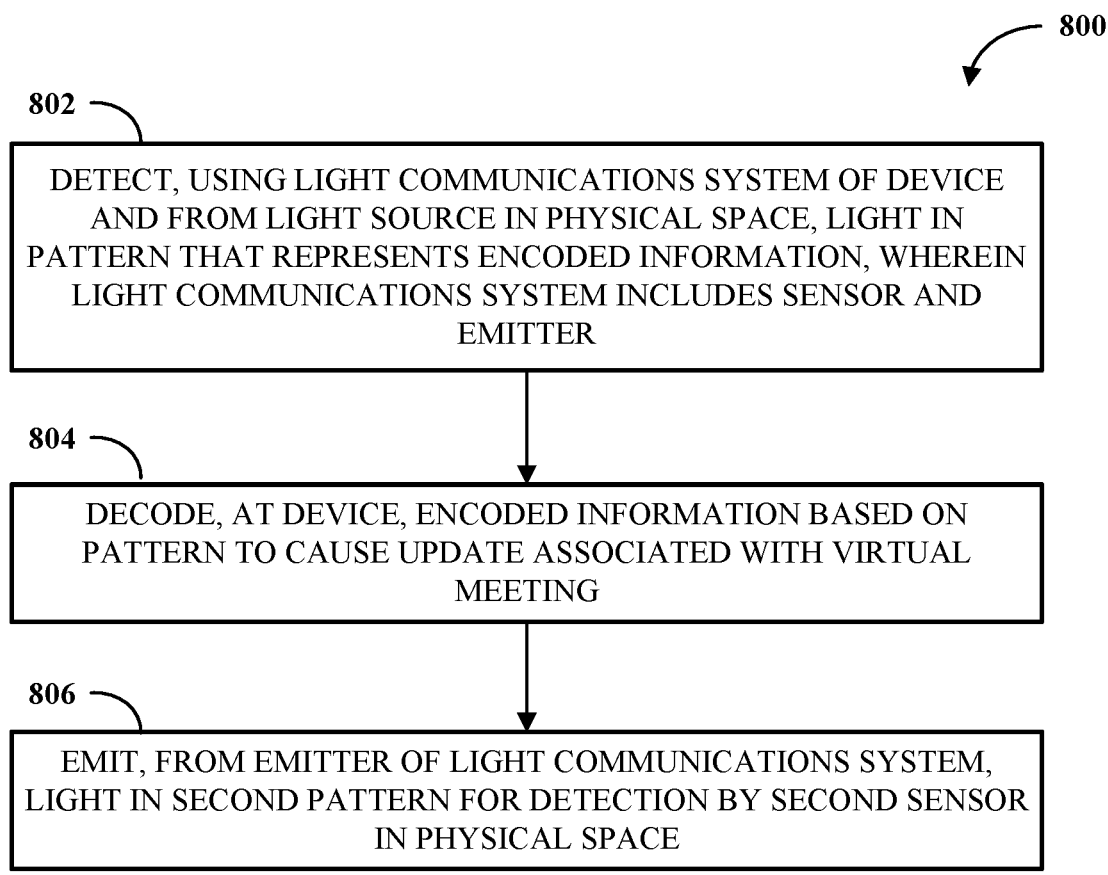
FIG. 8 is a flowchart of an example of a technique for using a light communications system to cause an update associated with a virtual meeting.

To further describe some implementations in greater detail, reference is next made to examples of techniques which may be performed using a system for using light communications. FIG. 8 is a flowchart of an example of a technique 800 for using a light communications system to cause an update associated with a virtual meeting. The technique 800 can be executed using computing devices, such as the systems, hardware, and software described with respect to FIGS. 1-7. The technique 800 can be performed, for example, by executing a machine-readable program or other computer-executable instructions, such as routines, instructions, programs, or other code. The steps, or operations, of the technique 800 or another technique, method, process, or algorithm described in connection with the implementations disclosed herein can be implemented directly in hardware, firmware, software executed by hardware, circuitry, or a combination thereof.

For simplicity of explanation, the technique 800 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 802, a device may detect, using a light communications system of the device and from a light source in a physical space, light in a pattern that represents encoded information. For example, the user device 406 may detect, using the light communications system 420, which includes the sensor 422 and the emitter 424, and from the emitter 414 of the light communications system 410 of the system device 404, the light pattern 418 that represents the encoded information. The device may detect the light in a physical space, such as the physical space 500, the physical space 600, or the vehicle transportation network 700. In another example, the system device 404 may detect, using the light communications system 410, which includes the sensor 412 and the emitter 414, and from the emitter 424 of the light communications system 420 of the user device 406, the light pattern 416 that represents the encoded information.

At 804, the device may decode the encoded information based on the pattern to cause an update associated with a virtual meeting. For example, the light pattern may be decoded using Li-Fi. The update may include causing an event in a virtual meeting, such as the user device joining the virtual meeting as a companion device, invoking whiteboard tools for the user to use in the virtual meeting, such as when the user is in a position near a whiteboard in the physical space, or moving the user to a virtual breakout room associated with the virtual meeting based on the user's location in the physical space. In some implementations, the update may include causing a change in one or more peripheral devices (e.g., one or more of the peripheral devices 408A-D) located in the physical space during a virtual meeting, such as activating, deactivating, or adjusting a microphone, speaker, camera, lighting, and/or display. The activating, deactivating, or adjusting could be based on the user's position, location, direction, or activity in the physical space as the user participates in the virtual meeting. In some implementations, the update may include causing a pairing between the user device and another device (e.g., the system device 404, or a peripheral device). The pairing may enable bidirectional communication between the user device and the other device. The pairing may be enabled, for example, via Wi-Fi or Bluetooth.

At 806, the device may emit light in a second pattern for detection by a second sensor in the physical space. For example, the user device 406 may emit light from the emitter 424 of the light communications system 420. The light may be emitted for detection by the sensor 412 of the light communications system 410. In another example, the system device 404 may emit light from the emitter 414 of the light communications system 410. The light may be emitted for detection by the sensor 422 of the light communications system 420. The light may be emitted to transmit additional encoded information.

Figure 9:
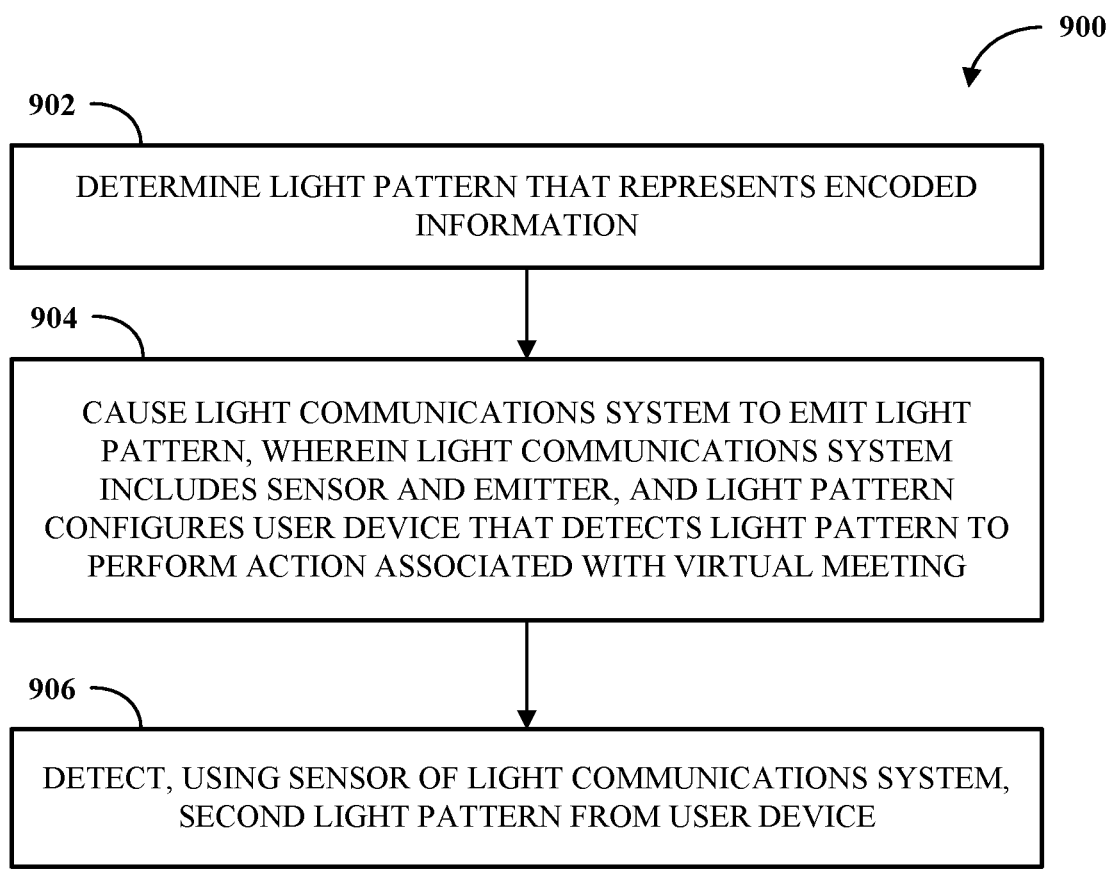
FIG. 9 is a flowchart of an example of a technique for determining a light pattern to configure a user device for a virtual meeting.

FIG. 9 is a flowchart of an example of a technique 900 for determining a light pattern to configure a user device for a virtual meeting. The technique 900 can be executed using computing devices, such as the systems, hardware, and software described with respect to FIGS. 1-7. The technique 900 can be performed, for example, by executing a machine-readable program or other computer-executable instructions, such as routines, instructions, programs, or other code. The steps, or operations, of the technique 900 or another technique, method, process, or algorithm described in connection with the implementations disclosed herein can be implemented directly in hardware, firmware, software executed by hardware, circuitry, or a combination thereof.

For simplicity of explanation, the technique 900 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 902, a system device may determine a light pattern that represents encoded information. The encoded information may be associated with a virtual meeting (e.g., a meeting identifier), one or more peripheral devices (e.g., an identifier for a hardware component, such as for one or more peripheral devices 408A-D), or a position or a direction (e.g., an identifier for a determining a position or a direction of the same device or another device). For example, the light pattern may be emitted using Li-Fi. The light pattern may include a pulsing pattern or a modulation of intensity, such as cycling on and off in a particular frequency range, resulting in a unique signature carrying data represented by the encoded information. The light in the light pattern may be imperceptible to the human eye. For example, the light may be imperceptible based on the spectrum of light that is emitted (e.g., ultraviolet), and/or the frequency range of the pattern (e.g., the pulsing pattern or the modulation, cycling on and off faster than humanly observable).

At 904, the system device may cause a light communications system to emit the light pattern. The light communications system may include a sensor and an emitter. For example, the system device 404 may cause the light communications system 410, which includes the sensor 412 and the emitter 414, to emit the light pattern via the emitter 414. The light pattern may configure a user device that detects the light pattern to perform an update associated with the virtual meeting. For example, the light pattern may configure the user device 406 that detects the light pattern to perform an update associated with the virtual meeting.

At 906, the system device may detect, via the sensor of the light communications system, a second light pattern from the user device. For example, the system device 404 may detect, via the sensor 412, a second light pattern from the user device. The second light pattern may be decoded to receive additional encoded information.

Some implementations may include a method comprising detecting, using a light communications system of a user device and from a light source in a physical space, light in a pattern that represents encoded information, wherein the light communications system includes a sensor and an emitter; and decoding, at the user device, the encoded information based on the pattern to cause an update associated with a virtual meeting. In some implementations, the encoded information includes a meeting identifier, and the update includes the user device joining the virtual meeting using the meeting identifier. In some implementations, the update includes adjusting at least one of a microphone or a speaker in the physical space. In some implementations, the update includes a pairing between the user device and a second device that enables bidirectional communication between the user device and the second device. In some implementations, the encoded information enables determining a location of the user device in the physical space. In some implementations, the pattern is imperceptible to the human eye. In some implementations, the method may include emitting, from the emitter of the light communications system, light in a second pattern for detection by a second sensor in the physical space. In some implementations, the light in the pattern is constrained to a first location in the physical space, and the method may include detecting, using the sensor of the light communications system, light in a second pattern constrained to a second location in the physical space.

Some implementations may include an apparatus comprising a memory; and a processor configured to execute instructions stored in the memory to detect, using a light communications system of a user device and from a light source in a physical space, light in a pattern that represents encoded information, wherein the light communications system includes a sensor and an emitter; and decode, at the user device, the encoded information based on the pattern to cause an update associated with a virtual meeting. In some implementations, the update includes invoking whiteboard tools in the virtual meeting. In some implementations, the update includes adjusting a pan-tilt-zoom camera in the physical space. In some implementations, the update includes a pairing between the user device and a second device that enables at least one of Bluetooth or Wi-Fi communication between the user device and the second device. In some implementations, the encoded information enables determining a direction of the user device in the physical space. In some implementations, the pattern is imperceptible to the human eye. In some implementations, the processor is further configured to execute instructions stored in the memory to emit, from the emitter of the light communications system, light in a second pattern for detection by a second sensor in the physical space.

Some implementations may include a non-transitory computer readable medium storing instructions operable to cause one or more processors to perform operations comprising detecting, using a light communications system of a user device and from a light source in a physical space, light in a pattern that represents encoded information, wherein the light communications system includes a sensor and an emitter; and decoding, at the user device, the encoded information based on the pattern to cause an update associated with a virtual meeting. In some implementations, the update includes moving a user of the user device to a virtual breakout room associated with the virtual meeting. In some implementations, the update includes outputting a message to a display in the physical space. In some implementations, the update includes a pairing between the user device and a second device that enables bidirectional communication between the user device and the second device. In some implementations, the encoded information enables determining a position of the user device in the physical space.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising: detecting, using a light communications system of a user device and from a light source in a physical space, light in a pattern that represents encoded information, wherein the light communications system includes a sensor and an emitter; decoding, at the user device, the encoded information based on the pattern to cause an update associated with a virtual meeting; and adjusting a peripheral device, according to a location of the user device, based on patterns of the light assigned to respective locations of the physical space.

2. The method of claim 1, wherein the encoded information includes a meeting identifier, and the update includes the user device joining the virtual meeting using the meeting identifier.

3. The method of claim 1, wherein the update includes adjusting at least one of a microphone or a speaker in the physical space.

4. The method of claim 1, wherein the update includes a pairing between the user device and a second device that enables bidirectional communication between the user device and the second device.

5. The method of claim 1, wherein the pattern is imperceptible to a human eye.

6. The method of claim 1, further comprising:
emitting, from the emitter of the light communications system, light in a second pattern for detection by a second sensor in the physical space.

7. The method of claim 1, wherein the locations comprise: a first location and a second location, and wherein the light in a pattern is constrained to the first location in the physical space, and further comprising: detecting, using the sensor of the light communications system, light in a second pattern constrained to the second location in the physical space.

8. The method of claim 1, further comprising:
controlling ambient light within the physical space with shades.

9. An apparatus, comprising: a memory; and a processor configured to execute instructions stored in the memory to:

detect, using a light communications system of a user device and from a light source in a physical space, light in a pattern that represents encoded information, wherein the light communications system includes a sensor and an emitter; decode, at the user device, the encoded information based on the pattern to cause an update associated with a virtual meeting; and adjust a peripheral device, according to a location of the user device, based on the patterns of the light assigned to respective locations of the physical space.

10. The apparatus of claim 9, wherein the update includes invoking whiteboard tools in the virtual meeting.

11. The apparatus of claim 9, wherein the update includes adjusting a pan-tilt-zoom camera in the physical space.

12. The apparatus of claim 9, wherein the update includes a pairing between the user device and a second device that enables at least one of a short range wireless communication or Wi-Fi communication between the user device and the second device.

13. The apparatus of claim 9, wherein the pattern is imperceptible to a human eye.

14. The apparatus of claim 9, wherein the processor is further configured to execute instructions stored in the memory to:
   emit, from the emitter of the light communications system, light in a second pattern for detection by a second sensor in the physical space.

15. The apparatus of claim 9, further comprising:
   shades that are configured to control ambient light within the physical space.

16. A non-transitory computer readable medium storing instructions operable to cause one or more processors to perform operations comprising: detecting, using a light communications system of a user device and from a light source in a physical space, light in a pattern that represents encoded information, wherein the light communications system includes a sensor and an emitter; decoding, at the user device, the encoded information based on the pattern to cause an update associated with a virtual meeting; and adjusting a peripheral device, according to a location of the user device, based on patterns of the light assigned to respective locations of the physical space.

17. The non-transitory computer readable medium storing instructions of claim 16, wherein the update includes moving a user of the user device to a virtual breakout room associated with the virtual meeting.

18. The non-transitory computer readable medium storing instructions of claim 16, wherein the update includes outputting a message to a display in the physical space.

19. The non-transitory computer readable medium storing instructions of claim 16, wherein the update includes a pairing between the user device and a second device that enables bidirectional communication between the user device and the second device.

20. The non-transitory computer readable medium storing instructions of claim 16, further comprising:
   controlling ambient light within the physical space via the peripheral device comprising shades.

\* \* \* \* \*